(12) United States Patent
Kang

(10) Patent No.: US 6,340,871 B1
(45) Date of Patent: Jan. 22, 2002

(54) HORIZONTAL-DEFLECTION CORRECTION CIRCUIT

(75) Inventor: Ho-Woong Kang, Yorigin (KR)

(73) Assignee: Samsung Electronics, Co. Ltd., Suwon (KR)

( * ) Notice: Subject to any disclaimer, the term of this patent is extended or adjusted under 35 U.S.C. 154(b) by 0 days.

(21) Appl. No.: 09/613,572

(22) Filed: Jul. 11, 2000

(30) Foreign Application Priority Data

Dec. 23, 1999 (KR) ............................................. 99 61071

(51) Int. Cl.[7] .................................................. G09G 1/04
(52) U.S. Cl. ...................................... 315/370; 315/405
(58) Field of Search ................................ 315/370, 371, 315/369, 368.21, 405, 364

(56) References Cited

U.S. PATENT DOCUMENTS

| | | | | |
|---|---|---|---|---|
| 5,355,058 A | * | 10/1994 | Jackson et al. | ............. 315/371 |
| 5,596,250 A | * | 1/1997 | Truskalo | .................... 315/371 |
| 5,844,381 A | * | 12/1998 | Kwon et al. | ................ 315/371 |
| 6,013,989 A | * | 1/2000 | Lee | .............................. 315/371 |
| 6,201,358 B1 | * | 3/2001 | Tadano | ........................ 315/370 |

* cited by examiner

*Primary Examiner*—Don Wong
*Assistant Examiner*—Ephrem Alemu
(74) *Attorney, Agent, or Firm*—Robert E. Bushnell, Esq.

(57) ABSTRACT

A horizontal-deflection correction circuit may be constructed with a horizontal deflection stage for deflecting a scan electronic beam in a horizontal direction by a sawtooth current flowing in horizontal deflection coil; a control stage for outputting a first and second control voltages which have the same value in case of performing a linear correction and for outputting the first and second control voltages which have different values in case of performing a S-shaped correction; a first correction stage for varying an inductance of a first variable inductor connected in series to the horizontal deflection coil according to the first control voltage and for correcting a magnitude and a direction of the sawtooth current; and a second correction stage for varying an inductance of the second variable inductor connected in series to the first variable inductor in an opposite polarity and for correcting the magnitude and the direction of the sawtooth current.

20 Claims, 8 Drawing Sheets

FIG. 4A *(Background Art)*
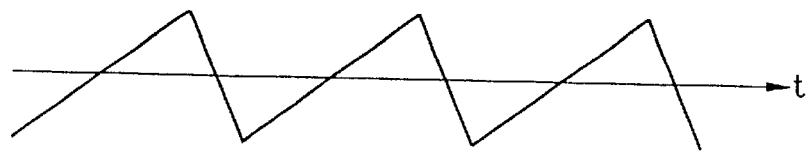
FIG. 4B *(Background Art)*
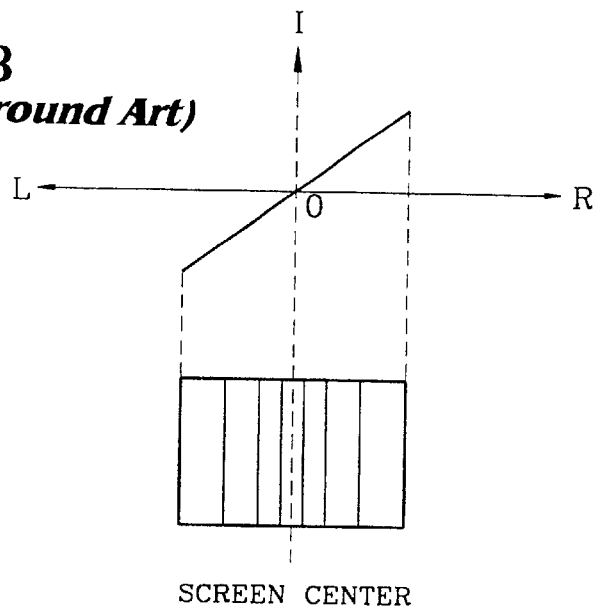
SCREEN CENTER
FIG. 4C *(Background Art)*
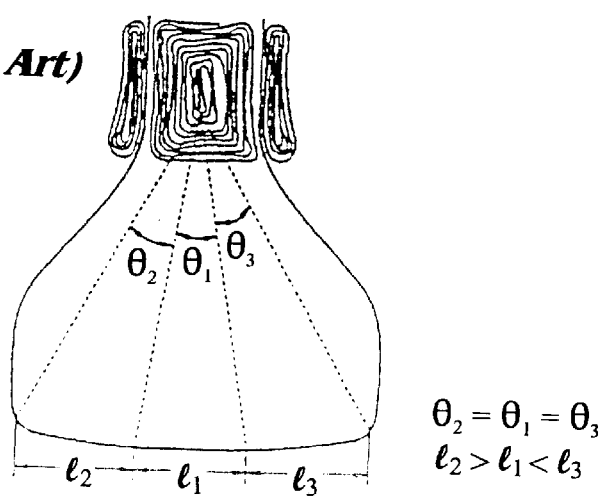
$\theta_2 = \theta_1 = \theta_3$
$\ell_2 > \ell_1 < \ell_3$

SCREEN CENTER $\theta_2 < \theta_1 > \theta_3$ $\ell_2 = \ell_1 = \ell_3$

SCREEN CENTER

SCREEN CENTER

SCREEN CENTER

HORIZONTAL-DEFLECTION CORRECTION CIRCUIT

CLAIM OF PRIORITY

This application makes reference to, incorporates the same herein, and claims all benefits accruing under 35 U.S.C §119 from an application entitled *Horizontal-Deflection Correction Circuit* earlier filed in the Korean Industrial Property Office on Dec. 23, 1999, and there duly assigned Serial No. 99-61071 by that Office.

BACKGROUND OF THE INVENTION

1. Field of the Invention

The present invention relates to a circuit for correcting a horizontal deflection, and more particularly to a horizontal-deflection correction circuit providing either or both a S-shaped correction and a linear correction of a sawtooth current flowing in a horizontal deflection coil.

2. Background Art

In general, a cathode ray tube (CRT) employed in a video display apparatus uses a principle displaying different brightness and colors by striking fluorescent materials of red (R), green (G), and blue (B) coated on a surface of the cathode ray tube with a different amount of an electronic beam according to an intensity of a video signal, and is widely used since its price and its display performance are widely accepted. The video display apparatus receives a video signal and a synchronization signal from a video card of a personal computer and display images on the screen of the cathode ray tube. Rasters may be formed on the entire screen of the cathode ray tube by deflecting an electronic beam irradiated from the electron gun to the horizontal and vertical directions by supplying sawtooth currents to the horizontal deflection coil and the vertical deflection coil. Accordingly, if the microcomputer outputs a plurality of additional control signals with a low level or a high level corresponding to the horizontal frequency, transistor switches are respectively turned on or off, so auxiliary correction capacitors connected to the deflection coil are selectively either incorporated into the circuit or are switched out of the circuit and the magnitude of the sawtooth current is varied. The edge portions of the screen grow wider than the center portion however, because of the change from the horizontal frequency from a low frequency to a high frequency. Inductances of coils vary according to the magnitude and direction of current flow, so that the magnitude and the direction of the sawtooth current flowing through the horizontal deflection coil vary. In a horizontal-deflection correction circuit constructed according to contemporary design practice, since an entire capacitance is determined by switching plural capacitors by plural S-shaped correction control signals and an average capacitance is allocated by dividing a horizontal synchronization signal into several frequency bandwidths, I have noticed that an exact S-shaped correction is not obtained in correspondence with the respective horizontal frequencies, but that only an approximate S-shaped correction is achieved. In order to control the circuit of the present invention by plural S-shaped correction control signals, since a microcomputer equipped with plural S-shaped correction control ports is required and plural S-shaped correction capacitors and plural switching devices are required; production costs are increased however, and I have found that the correction circuit is complex in structure and its implementation is difficult and requires too much space for installation on a printed circuit board built into a monitor.

SUMMARY OF THE INVENTION

It is an object of the present invention to provide an improved horizontal-deflection process and circuit.

It is another object to provide a simplified horizontal-deflection correction process and circuit that may be implemented with a lower per unit cost, with a lower rejection rate.

It is yet another object to provide a horizontal-deflection correction process and circuit that may be constructed with fewer capacitors.

It is still another object to provide a horizontal-deflection correction process and circuit that requires fewer switching stages.

It is still yet another object to provide a horizontal-deflection correction process and circuit amenable to miniaturization and compact circuit board construction.

It is a further object to provide a horizontal-deflection correction process and circuit capable of making an S-shaped correction and a linearity correction with respect to a sawtooth current flowing in a horizontal deflection coil by supplying correction currents to double variable coils having opposite polarity to each other according to a horizontal frequency.

These and other objects may be attained with a horizontal-deflection correction circuit providing either or both a S-shaped correction and a linearity correction on the basis of a sawtooth current flowing in a horizontal deflection coil by supplying correction currents to double variable coils having opposite polarity to each other according to a horizontal frequency. A horizontal-deflection correction circuit may be constructed according to the principles of the present invention with a horizontal deflection stage for deflecting a scan electronic beam in a horizontal direction by a sawtooth current flowing in horizontal deflection coil; a control stage outputting a first and second control voltages which have the same value in case of performing a linear correction and outputting the first and second control voltages which have different values in case of performing a S-shaped correction; a first correction stage for varying an inductance of a first variable inductor connected in series to the horizontal deflection coil according to the first control voltage and correcting a magnitude and a direction of the sawtooth current; and a second correction stage for varying an inductance of the second variable inductor connected in series to the first variable inductor in an opposite polarity and correcting the magnitude and the direction of the sawtooth current.

In the practice of the principles of the present invention, the horizontal-deflection correction circuit supplies correction currents to double variable coils having opposite polarities to each other, respectively, according to horizontal frequencies to perform at least one or more S-shaped correction or linearity correction with respect to a sawtooth current flowing in the horizontal deflection coils, so that the number of capacitors for the S-shaped correction and the number of switching stages are greatly reduced to lower the production cost as well as to simplify a circuit construction for an easy embodiment so that a market-rejection rate is remarkably reduced, compared to a contemplated horizontal-deflection correction circuit. When the horizontal-deflection correction circuit performs an approximate S-shaped correction according to respective horizontal frequencies by allotting an average capacitance by dividing a horizontal synchronization signal by frequency bandwidths, the horizontal-deflection correction circuit according to an embodiment of the present invention determines variable inductances according to respective frequencies of a horizontal synchronization signal to perform an exact S-shaped correction.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIGS. 4A through 4C show the state of the video screen of a display device as a function of a sawtooth current;

DETAILED DESCRIPTION OF THE INVENTION

Figure 1:
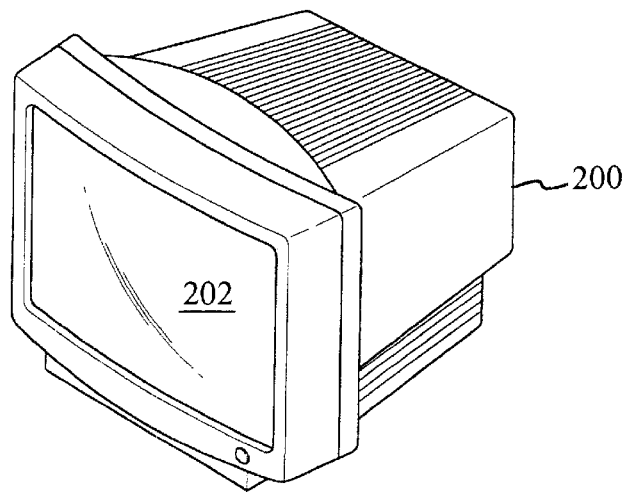
FIG. 1 is a perspective view for showing a video display device suitable for the practice of the principles of the present invention.
Figure 2:
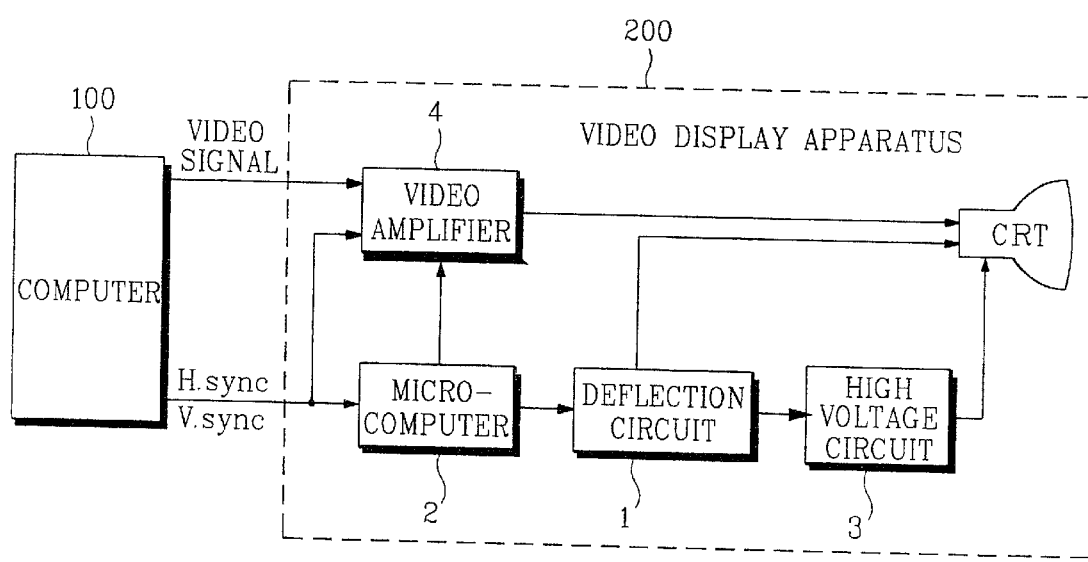
FIG. 2 is a block diagram of a video display apparatus employing a cathode ray tube.

Turning now to the drawings, FIGS. 1 and 2 illustrate a video display apparatus 200 that receives a video signal and horizontal and vertical synchronization signals from a video card mounted within a personal computer 100, and displays varying visual images on the screen 202 of the cathode ray tube 200 in response to those signals, and a block diagram of video display apparatus 200 employing a general cathode ray tube. Video display apparatus 200 includes a deflection circuit 1, a microcomputer 2, high-voltage circuit 3, video amplifier 4, and cathode ray tube. As shown in FIG. 2, a RGB video signal input from a video card of personal computer 100 is amplified through the video amplifier 4, and applied to a cathode terminal of the cathode ray tube to display images on the screen borne by cathode ray tube CRT. In order to display images on the screen of the cathode ray tube with the RGB video signal, rasters should be formed across the entire screen of the cathode ray tube by deflecting an electronic beam irradiated from the electron gun mounted in the neck of cathode ray tube CRT in the horizontal and vertical directions by supplying sawtooth currents to the horizontal deflection coil and to the vertical deflection coil. These sawtooth currents are produced from deflection circuit 1 in correspondence with the horizontal synchronization signal and the vertical synchronization signal input from the video card of personal computer 100, and are applied to the horizontal deflection coil and the vertical deflection coil.

The video card within computer 100 supports various video modes, and outputs different horizontal and vertical frequencies in accordance with the resolution of each of the corresponding video modes. Flickering is prevented because the horizontal and vertical frequencies are increased from a low frequency to a high frequency, thereby reducing eye fatigue of the user. A multiple mode video display apparatus is a video display device that is capable of interchangeably providing at least two or more video modes, and controlling display size and position, with the deflection circuit and the deflection correction circuit being adjusted according to various horizontal frequencies (approximate 30~75 Khz) input from the video card.

Figure 3:
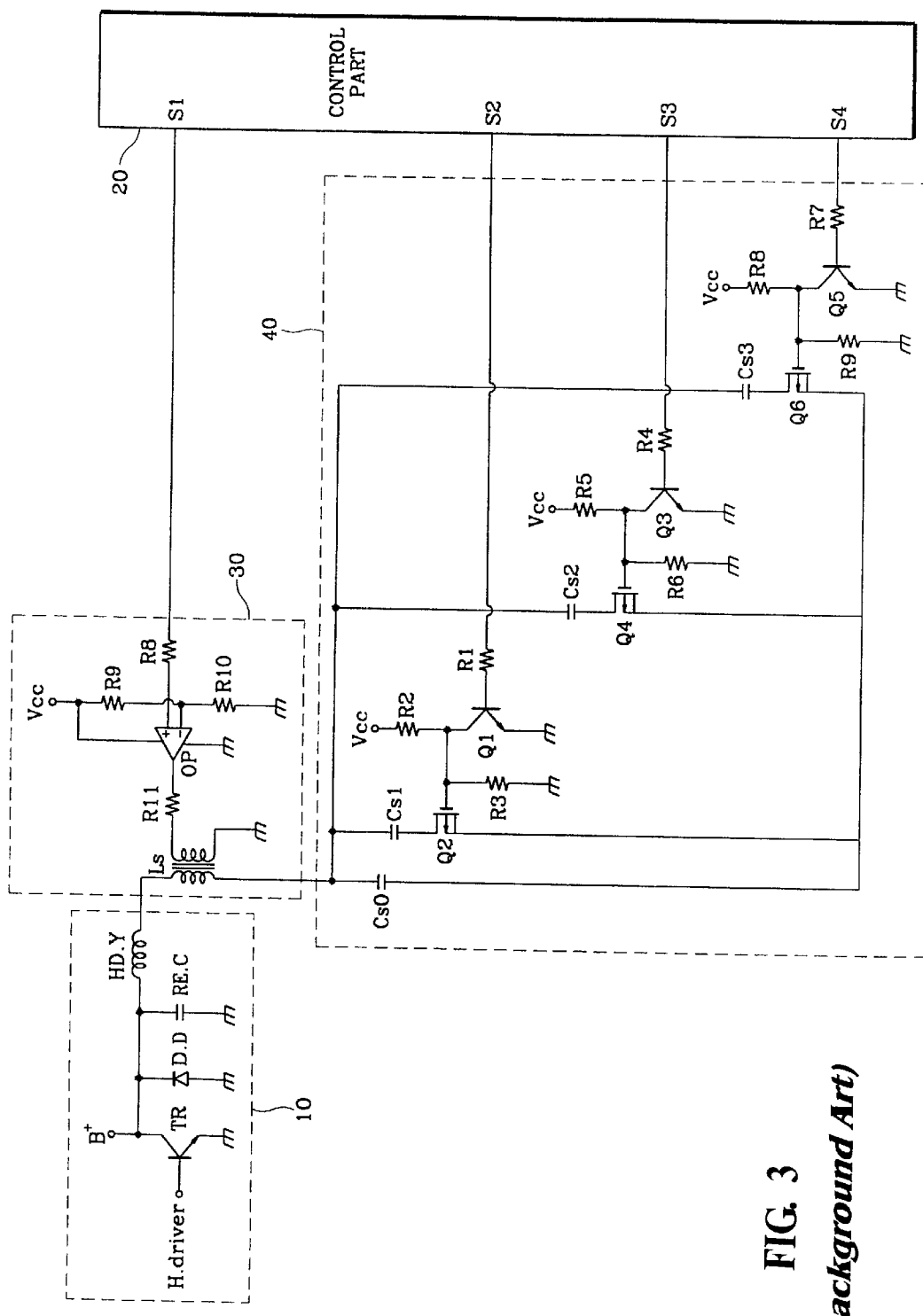
FIG. 3 is a circuit diagram of a contemporary design for a horizontal-deflection correction circuit of a video display device.

FIG. 3 is a circuit diagram showing a contemplated horizontal-deflection correction stage of deflection circuit 1 for a video display apparatus. As shown in FIG. 3, the contemplated horizontal-deflection correction circuit includes horizontal deflection stage 10, control stage 20, linearity correction stage 30, and S-shaped correction stage 40. Operation of this horizontal-deflection correction stage will be described in detail with reference to FIGS. 4A through 4C, FIGS. 5A through 5C, and FIGS. 6A through 6D, below.

Figure 5A:
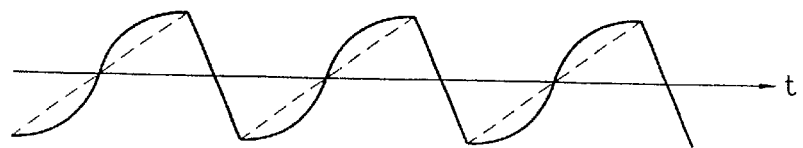
FIGS. 5A through 5C show the state of the video screen of a display device as a function of a S-shaped sawtooth current.
Figure 5B:
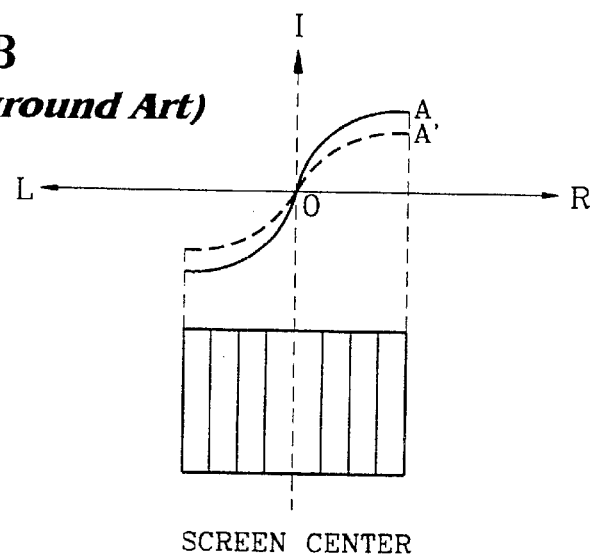
Figure 5C:
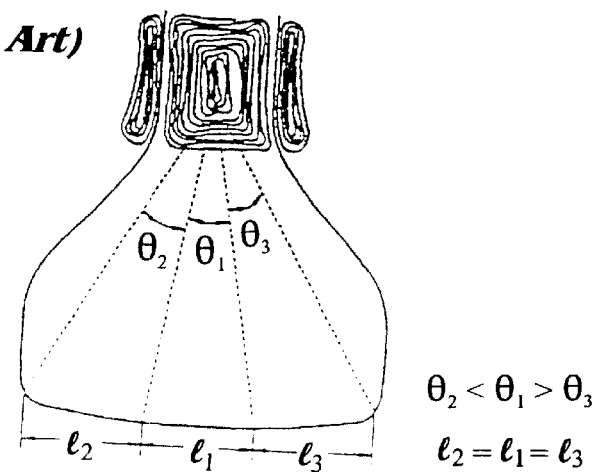

FIGS. 4A through 4C show the state of the screen of a cathode ray tube driven with a sawtooth current exhibiting the waveform shown by FIG. 4A, FIGS. 5A through 5C show a state of video screen 202 of a cathode ray tube CRT driven with a S-shaped sawtooth current exhibiting the waveform shown by FIG. 5A, and FIGS. 6A through 6D show variations in the state of video screen 202 that correspond to changes of the inductance of a correction coil. First, operation of the horizontal deflection stage 10 will be described. That is, a horizontal synchronization signal output from a video card (not separately shown) mounted within computer 100 is properly modulated by a horizontal drive signal H. driver through a horizontal oscillation stage (not separately shown) and a horizontal drive stage (not separately shown), and supplied to the base electrode of a horizontal output transistor TR, so that the horizontal output transistor TR is turned on and off in correspondence with the amplitude of the modulated horizontal synchronization signal. At this time, a sawtooth current $I_{HDY}$ flows in a horizontal deflection coil HD.Y by a damper diode D.D and a flyback capacitor RE.C to perform a horizontal deflection of an electronic beam. If a complete sawtooth current $I_{HDY}$ flows in the horizontal deflection coil HD.Y as shown in FIG. 4A however, a phenomenon appears in which, as shown in FIG. 4B, the right and left edge portions of the screen grow wider. This is because the distance between the fluorescent surface of monitor 200 and the center portion of the horizontal deflection coil HD.Y gets longer as measured from the center portion to both edges of the screen, and the amount of variation in the angle of horizontal deflection for horizontal deflection coil HD.Y remains constant with respect to the entire screen, so that:

$$\theta_2 = \theta_1 = \theta_3, \tag{1}$$

and $$l_2 > l_1 > l_3, \tag{2}$$

as is shown in FIG. 4C. Accordingly, as shown in FIG. 5B, in order to prevent the phenomenon that the right and left edge portions of the screen grow wider than the center portion, the amount of variation in the horizontal deflection angle of the horizontal deflection coil HD.Y is varied as shown by FIG. 5C when supplying the S-shaped sawtooth current $I_{HDY}$ shown in FIG. 5A to the horizontal deflection coil HD.Y, so that:

$$\theta_2 < \theta_1 < \theta_3, \quad (3)$$

and $$l_2 = l_1 = l_3. \quad (4)$$

In order to produce the S-shaped sawtooth current $I_{HDY}$ as stated above, the S-shaped correction stage 40 is connected to one side of the primary winding of the horizontal deflection coil HD.Y, and capacitance of the S-shaped correction stage 40 should be varied according to variation of the horizontal frequency. The S-shaped correction stage 40 has a structure with a plurality of auxiliary correction capacitors Cs1, Cs2, and Cs3 are connected in parallel with a basic correction capacitor Cs0 connected in series with the primary winding of horizontal deflection coil HD.Y. Accordingly, if the microcomputer 20 outputs second, third, and fourth control signals S2, S3, and S4 of a low level or a high level according to a horizontal frequency, first, second, third, fourth, fifth, and sixth transistors Q1, Q2, Q3, Q4, Q5, and Q6 are respectively turned on or off, so that the plurality of auxiliary correction capacitors Cs1, Cs2, and Cs3 connected to the basic correction capacitor Cs0 are selectively switched. A capacitance value of the basic correction capacitor is added to a capacitance value of an auxiliary correction capacitor to vary an entire correction capacitance value, so that a magnitude of the sawtooth current $I_{HDY}$ is adjusted. At this time, if the edge portions of the screen grow wider than the center portion due to a change from the horizontal frequency from a low frequency to a high frequency and the like, a current waveform is changed from A to A' as shown in FIG. 5B by reducing a capacitance of the correction capacitor Cs. That is, by linearly reducing the capacitance of the correction capacitor Cs in accordance with a linear increase in the horizontal frequency, the right and left edge portions of the video screen can be prevented from growing wider than the center portion. In the meantime, in order to exactly adjust the right and left widths of the screen to the same width, linearity correction stage 30 is connected to one side of horizontal deflection coil HD.Y so that the inductance of the linearity correction stage 30 will be varied according to the variation of the horizontal frequency.

More specifically, the control stage 20 outputs a control voltage of 0~5 Volts at terminal S1 according to a horizontal frequency received from a video card, and an operational amplifier OP within linearity correction stage 30 amplifies the control voltages of 0~5 Volts to a range of voltages extending between +Vcc~–Vcc, and supplies the amplified voltage to primary coil of transformer Ls. The inductance of the secondary coil varies according to magnitude and direction of current flowing in the primary coil of the transformer Ls, so that the magnitude and the direction of the sawtooth current $I_{HDY}$ flowing in the horizontal deflection coil HD.Y are varied in correspondence.

Figure 6A:
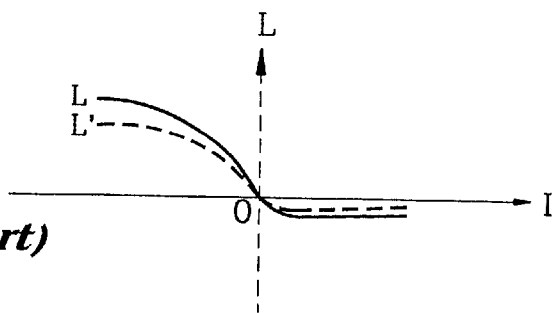
FIGS. 6A through 6D show the state of the video screen of a display device as a function of variations in the inductances of a correction coil.
Figure 6B:
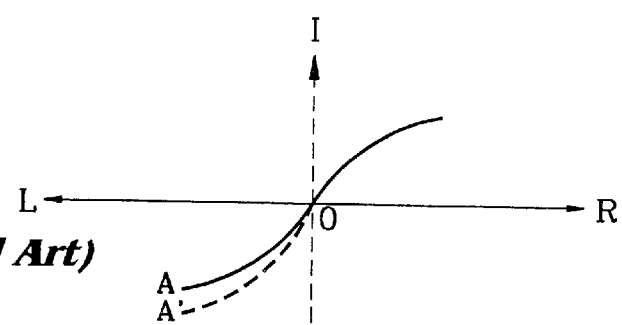
Figure 6C:
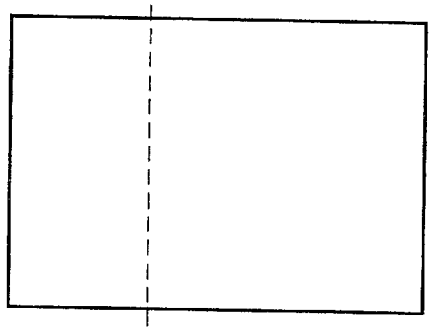
Figure 6D:
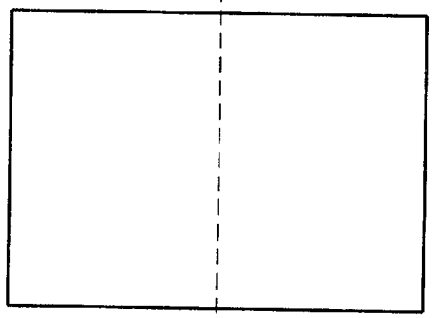

As is shown in FIG. 6C, if the screen center portion grows wider to the left or if the horizontal frequency is changed from a low frequency to a high frequency, an inductance waveform varies from L to L' as shown in FIG. 6A due to the reduction of the inductances of the coil HD.Y and transformer Ls1. Accordingly, as shown in FIG. 6B, a current waveform is changed from A to A', so that the right and left widths of the screen are exactly adjusted to provide nearly equal widths to both the right and left halves of the screen, as is shown by FIG. 6D. That is, by linearly reducing the inductances of transformer Ls1 according to a horizontal frequency that linearly increases, the right and left widths of the screen can be made nearly equal in width.

As stated above, in a horizontal-deflection correction circuit contemplated by the inventor, the correction capacitors Cs0, Cs1, Cs2, Cs3 are connected to the secondary winding of transformer Ls and are in series with the horizontal deflection coil HD.Y. Transformer Ls is supposed to provide an exact adjustment of the symmetry of the right and left horizontal widths of the video screen, the correction capacitors Cs1, Cs2, Cs3 are supposed to prevent occurrence of the phenomenon that enables the edge portions of the video screen to grow wider than the center portion of the video screen, so that the inductances of transformer Ls and the capacitances of the correction capacitors Cs1, Cs2, Cs3 determine the magnitude and oscillation frequency of the sawtooth current $I_{HDY}$. In this horizontal-deflection correction circuit, the entire capacitance is determined by switching a plurality capacitors by plural S-shaped correction control signals output from a microcomputer and an average capacitance is allocated by dividing a horizontal synchronization signal into several frequency bandwidths. Consequently, a problem exists because an exact S-shaped correction is not achieved according to respective horizontal frequencies, but only an approximate S-shaped correction is obtained. In order to control the circuit of the present invention by plural S-shaped correction control signals, since a microcomputer equipped with plural S-shaped correction control ports is required and plural S-shaped correction capacitors and plural switching devices are required, there are other problems with the concomitant increase in production costs and the complex structure of the circuit which causes some difficulty in its implementation and requires too much space for installation on a printed circuit board incorporated within the housing of a video monitor.

Figure 7:
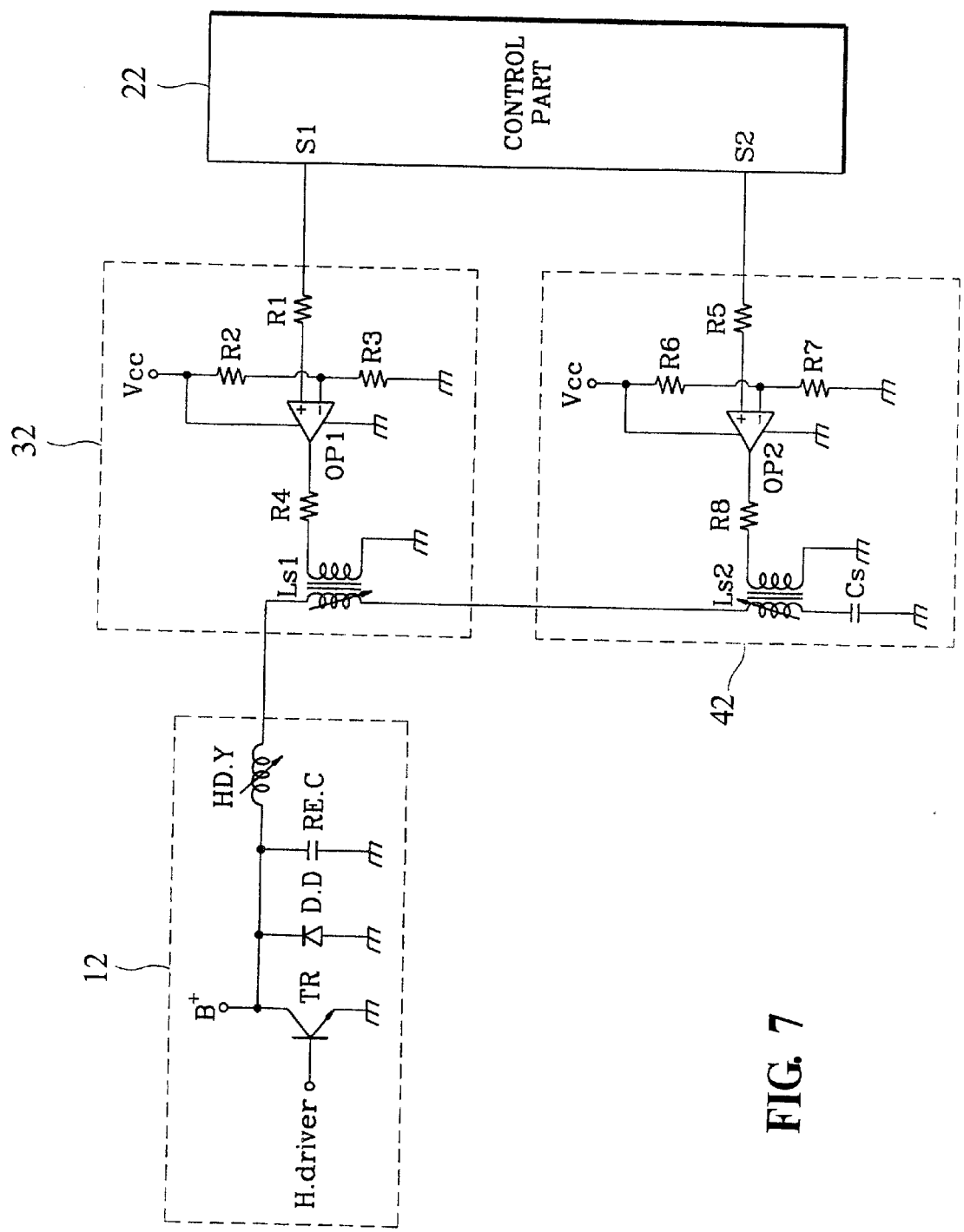
FIG. 7 is a circuit diagram showing a horizontal-deflection correction circuit for a video display apparatus constructed as an embodiment of the principles of the present invention.

Turning now to FIG. 7, a circuit diagram illustrates one embodiment of a horizontal-deflection correction circuit for a video display apparatus that may be constructed according to the principles of the present invention. A horizontal deflection stage 12 horizontally deflects a scan beam with a sawtooth current $I_{HDY}$ flowing in a horizontal deflection coil HD.Y. Control stage 22 generates a first control voltage S1 and a second control voltage S2 that have the same value as each other when correcting linearity, and have different values when making an S-shaped correction. First correction stage 32 corrects the magnitude and direction of the sawtooth current $I_{HDY}$ by varying the inductance of a first variable inductor Ls1 connected in series to the horizontal deflection coil HD.Y in accordance with the first control voltage S1; and a second correction stage 42 corrects the magnitude and the direction of the sawtooth current $I_{HDY}$ by varying the inductance of a second variable inductance Ls2 connected in series to the first variable inductor Ls1, albeit with an opposite polarity of the primary windings.

Here, the first correction stage 32 includes a first correction-current supply stage OP1 for outputting a first correction current Ic1 of which magnitude and direction are varied according to the first control voltage S1; and the first inductor Ls1 connected in series to the horizontal deflection coil HD.Y and for correcting a magnitude and a direction of the sawtooth current $I_{HDY}$ by varying an inductance according to a magnitude and a direction of the first correction current Ic1. First variable inductor Ls1 has a primary coil and a secondary coil wound on a core, the primary coil is supplied with the first correction current Ic1, and the secondary coil is supplied with the sawtooth current $I_{HDY}$, so that an inductance varies in accordance with the magnitude and the direction of the first correction current Ic1 to correct the magnitude and the direction of the sawtooth current $I_{HDY}$.

Second correction stage 42 has a second correction current supply stage OP2 for outputting a second correction current Ic2 of which magnitude and direction are varied according to the second control voltage S2; a second variable inductor Ls2 connected in series to the first variable inductor Ls1 in an opposite polarity and for correcting the magnitude and the direction of the sawtooth current $I_{HDY}$ by varying an inductance according to a magnitude and a direction of the second correction current Ic2; and a S-shaped correction capacitor Cs connected in series to the second variable inductor Ls2 and for producing a S-shaped sawtooth current $I_{HDY}$. Second variable inductor Ls2 has the primary coil and the second coil wound on a core, the first coil is supplied with the second correction current Ic2, and the second coil is supplied with the sawtooth current $I_{HDY}$, so that an inductance is varied according to the magnitude and the direction of the second correction current Ic2 to correct the magnitude and the direction of the sawtooth current $I_{HDY}$.

Control stage 22 outputs a control voltage of between approximately 0~5 Volts, according to the frequency of a horizontal synchronization signal input from external to the first and the second correction current supply stage OP1 and OP2. Here, the first and second correction current supply stages OP1 and OP2 supply a correction voltage of −Vcc~+Vcc to the first and second variable inductors, respectively, according to the control voltage of 0~5 Volts input from the control stage 22. The first and second correction current supply stages OP1 and OP2 input a control voltage of 0~+Va at the non-inversion terminal, input a reference voltage at the inversion terminal, output a correction voltage of 0~+Vcc to the first and second variable inductors Ls1 and Ls2 if the non-inversion input voltage is larger than the inversion input voltage, and an operational amplifier (OP amplifier) for outputting a correction voltage of −Vcc~0V to the first and second variable inductors Ls1 and Ls2.

Figure 8A:
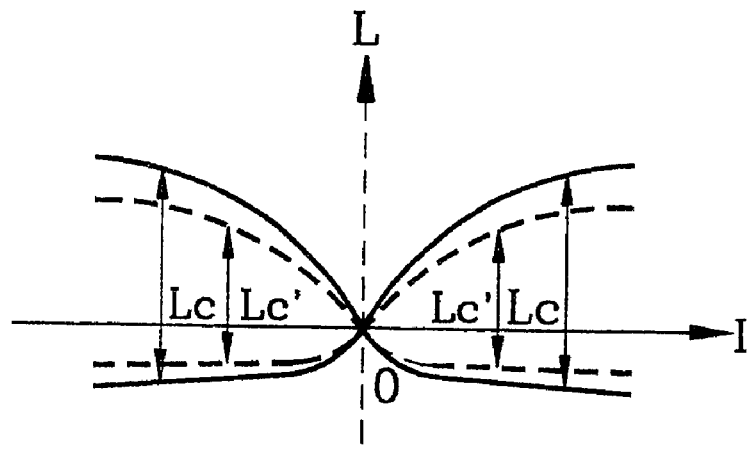
FIGS. 8A through 8C show the state of the video screen of a display device as a function of variations in the inductance of double variable coils providing S-shaped correction during the practice of the principles of the present invention.
Figure 8B:
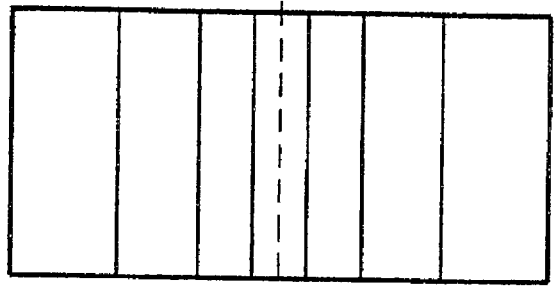
Figure 8C:
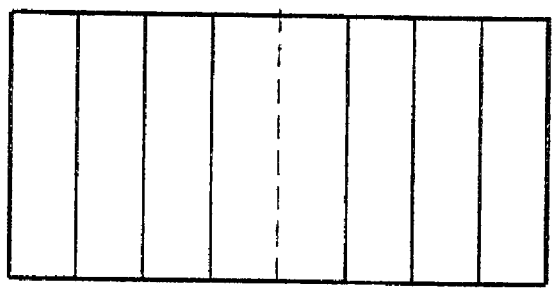

Hereinafter, operations, that is, the S-shaped correction operation and the linearity correction operation, of the circuit according to an embodiment of the present invention will be described in detail with reference to FIG. 7, FIGS. 8A through 8C, and FIGS. 9A through 9D. FIGS. 8A through 8C show a state of video screen 202 according to an inductance change of double variable coils in case of the S-shaped correction according to an embodiment of the present invention, and FIGS. 9A–9D show a state of video screen 202 according to an inductance change of double variable coils in case of correcting a linearity according to an embodiment of the present invention.

S-shaped Correction

An S-shaped correction is performed by controlling the inductances of the first and second variable inductors Ls1 and Ls2 by horizontal frequencies. At this time, the S-shaped correction is achieved by varying the inductances of the first variable inductor Ls1 and the second variable inductor Ls2 to the same value. First, control stage 22 outputs the first and second control voltages S1 and S2 of 0~5 Volts according to a horizontal frequency received from a video card, and the first and second correction current supply stages OP1 and OP2 amplify the first and second control is voltages of 0~5 Volts to voltages of +Vcc~−Vcc, respectively, and supply the amplified voltages to the primary coils of the first and second variable inductors Ls1 and Ls2.

Accordingly, the inductances of the first and second variable inductors Ls1 and Ls2 are varied according to a magnitude and a direction of an electric current flowing in the primary coils of the first and second variable inductors Ls1 and Ls2, so that a magnitude and a direction of an electric current flowing in the secondary coils of the first and second variable inductors Ls1 and Ls2 are varied. For example, the control stage 22 outputs the first and second control voltages S1 and S2 near to a zero Volts as the horizontal frequency gets lower and lower whereas the control stage 22 outputs the first and second control voltages S1 and S2 near to 5 Volts as the horizontal frequency gets higher and higher.

The first and second control voltages S1 and S2 are amplified by the first and second correction current supply stages OP1 and OP2, respectively, so that output voltages of the first and second correction current supply stages OP1 and OP2 become 5 Volts when the first and second control voltages S1 and S2 are zero Volts and output voltages of the first and second correction current supply stages OP1 and OP2 become −5 Volts when the first and second control voltages S1 and S2 are 5 Volts. At this time, if the voltages from the first and second correction current supply stages OP1 and OP2 rise higher from a zero potential to 5 Volts, the first and second correction currents Ic1 and Ic2 flow in the primary coils of the first and second variable inductors Ls1 and Ls2 in the same direction as the arrow direction as shown in FIG. 7, so that the inductances of the first and second variable inductors Ls1 and Ls2 increase by the first and second correction currents Ic1 and Ic2.

Alternatively, if voltages output from the first and second correction current supply stages OP1 and OP2 fall lower from zero Volts to −5 Volts, the first and second correction current Ic1 and Ic2 flow in the primary coils of the first and second variable inductors Ls1 and Ls2 in the opposite direction of the arrow shown in FIG. 7, so that the inductances of the first and second variable inductors Ls1 and Ls2 is decreased by the first and second correction currents Ic1 and Ic2. That is, if a horizontal synchronization signal of a low frequency is received from a video card, the control stage 22 outputs the first and second control voltages S1 and S2 of a low potential, the first and second correction current supply stages OP1 and OP2 amplify the output voltages S1 and S2 and then outputs voltages over a zero potential, so that the first and second correction currents Ic1 and Ic2 flow in the first and second variable inductors Ls1 and Ls2 in the same direction as the arrow direction for the inductances of the first and second variable inductors Ls1 and Ls2 become relatively higher.

Alternatively, if a horizontal synchronization signal of a high frequency is received from a video card mounted within computer 100, control stage 22 outputs first and second control voltages S1 and S2 of a high potential, and the first and second correction current supply stages OP1 and OP2 amplify the voltages S1 and S2 and then outputs voltages less than a zero potential, so that the first and second correction currents Ic1 and Ic2 flow in the first and second variable inductors Ls1 and Ls2 in an opposite direction to the arrow direction to relatively lower the inductances of the first and second variable inductors Ls1 and Ls2. For example, as shown in FIG. 8B, if edges of the screen grow wider than the center portion, or if a horizontal frequency is changed from a low frequency to a high frequency, inductances are reduced in order to change the entire inductance from Lc to Lc' as shown in FIG. 8A, so that occurrence of the phenomenon represented by FIG. 8B by which the edges of the screen grow wider than the center portion is prevented, and the relatively uniform distribution shown in FIG. 8C is obtained. That is, the S-shaped correction is instituted by linearly reducing the inductances of the first and second variable inductors Ls1 and Ls2 according to a frequency which is linearly increased. Here, the inductances of the first and second variable inductors Ls1 and Ls2 and a capacitance of a correction capacitor Cs determines an oscillating frequency and magnitude of the sawtooth current.

Linearity Correction

Figure 9A:
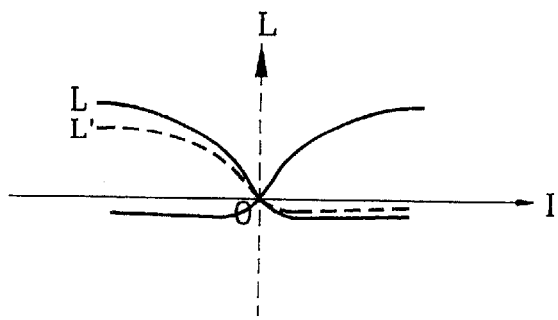
FIGS. 9A through 9D show the state of the video screen of a display device as a function of variations in the inductance of double variable coils providing correction of linearity during the practice of the principles of the present invention.
Figure 9B:
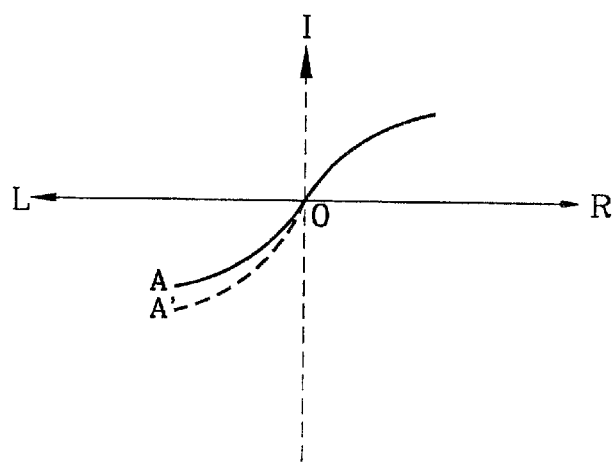
Figure 9C:
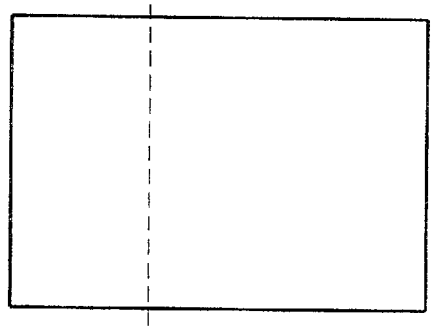
Figure 9D:
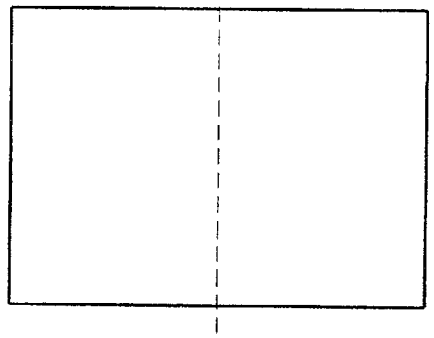

Linearity is corrected by controlling the inductances of the first and second variable inductors Ls1 and Ls2 by horizontal frequencies. At this time, the linearity is corrected as the first variable inductor Ls1 and the second variable inductor Ls2 are varied to different values of inductance. For example, as shown in FIG. 9C, if the center portion of the screen is deflected to the left or a horizontal frequency is changed from a low frequency to a high frequency, the inductances are reduced as is represented by the inductance waveform shown in FIG. 9A, and change from L to L', so that the current waveform changes from A to A', as is shown in FIG. 9B, for the width of the screen to be exactly and symmetrically adjusted on both the left and right sides with respect to the vertical center line of the screen as shown in FIG. 9D. At this time, the linearity may be corrected by the difference between the inductance value of the first variable inductor Ls1 and the inductance value of the second variable inductor Ls2. That is, the linearity is corrected by linearly reducing the difference between the inductance value of the first variable inductor Ls1 and the inductance value of the second variable inductor Ls2.

As stated above, a horizontal-deflection correction circuit that may be constructed as an embodiment of the principles of the present invention should supply correction currents to double variable coils that have polarities that vary oppositely from each other, respectively, according to horizontal frequencies in order to make both or either an S-shaped correction or a linearity correction with respect to a sawtooth current flowing in the horizontal deflection coils, so that the number of capacitors for the S-shaped correction and the number of switching stages are greatly reduced, thereby lowering the unit costs of production as well as simplifying circuit construction so that market-rejection rate will be marked reduced in comparison to contemporary designs for horizontal-deflection correction circuits. Additionally, contemporary horizontal-deflection correction circuit designs attempt to make an approximate S-shaped correction in correspondence with the respective horizontal frequencies by allotting an average capacitance and dividing a horizontal synchronization signal by frequency bandwidths, whereas any of the horizontal-deflection correction circuits that may be constructed as an embodiment of the principles of the present invention provides an exact S-shaped correction by the expedient of determining variable inductances according to the frequencies of the horizontal synchronization signal.

What is claimed is:

1. A horizontal-deflection correction circuit, comprising:
   a horizontal deflection stage for deflecting a scan electronic beam in a horizontal direction by a sawtooth current flowing in horizontal deflection coil;
   a control stage for outputting first and second control voltages having equal values when performing a linear correction and for outputting the first and second control voltages having different values when performing a S-shaped correction;
   a first correction stage responsive to the first control voltage for varying an inductance of a first variable inductor connected in series to the horizontal deflection coil to correct a magnitude and a direction of the sawtooth current; and
   a second correction stage responsive to the second control voltage for varying an inductance of a second variable inductor connected in series to the first variable inductor in an opposite polarity to correct the magnitude and the direction of the sawtooth current.

2. The horizontal-deflection correction circuit as claimed in claim 1, wherein the first correction stage includes:
   a first correction current supply stage for outputting a first correction current, a magnitude and a direction of said first correction current are varied according to the first control voltage; and
   said first variable inductor having varying inductance according to the magnitude and the direction of the first correction current to correct the magnitude and the direction of the sawtooth current.

3. The horizontal-deflection correction circuit as claimed in claim 2, wherein the first variable inductor is formed with a primary coil and a secondary coil wound on a core, the first correction current is supplied to the primary coil and the sawtooth current is supplied to the secondary coil.

4. The horizontal-deflection correction circuit as claimed in claim 1, wherein the second correction stage comprises:
   a second correction-current supply stage for outputting a second correction current, a magnitude and a direction of said second correction current are varied according to the second control voltage;
   said second variable inductor having varying inductance according to the magnitude and the direction of the second correction current to correct the magnitude and the direction of the sawtooth current; and
   a S-shaped correction capacitor for producing a S-shaped sawtooth current, said S-shaped correction capacitor being connected in series between the second variable inductor and a ground terminal.

5. The horizontal-deflection correction circuit as claimed in claim 4, wherein the second variable inductor is formed with a primary coil and a secondary coil wound on a core, the second correction current is supplied to the primary coil, and the sawtooth current is supplied to the secondary coil.

6. The horizontal-deflection correction circuit as claimed in claim 1, wherein the control stage outputs a control voltage of 0V~+Va to the first and second correction stages according to a frequency of an externally input horizontal synchronization signal.

7. The horizontal-deflection correction circuit as claimed in claim 2, wherein the control stage outputs a control voltage of 0V~+Va to the first correction-current supply stage according to a frequency of an externally input horizontal synchronization signal.

8. The horizontal-deflection correction circuit as claimed in claim 4, wherein the control stage outputs a control voltage of 0V~+Va to the second correction-current supply stage according to a frequency of an externally input horizontal synchronization signal.

9. The horizontal-deflection correction circuit as claimed in claim 7, wherein the first correction-current supply stage supplies a control voltage of −Vcc~+Vcc to the first variable inductor according to the control voltage of 0V~Va input from the control stage.

10. The horizontal-deflection correction circuit as claimed in claim 9, wherein the first correction-current supply stage is an operational amplifier that receives the control voltage of 0V~+Va at a non-inversion input terminal receives a reference voltage at an inversion input terminal, outputs a correction voltage of 0V~+Vcc to the first variable inductor if the input voltage of the non-inversion input terminal is higher than the input voltage of the inversion input terminal, and outputs the correction voltage of −Vcc~0V to the first variable inductor if the input voltage of the non-inversion input terminal is lower than the input voltage of the inversion input terminal.

11. The horizontal-deflection correction circuit as claimed in claim 8, wherein the second correction-current supply stage supplies a correction voltage of −Vcc~+Vcc to the second variable inductor according to the control voltage of 0V~+Va input from the control stage.

12. The horizontal-deflection correction circuit as claimed in claim 11, wherein the second correction-current supply stage is an operational amplifier that receives the control voltage of 0V~+Va at a non-inversion input terminal, receives a reference voltage at an inversion input terminal outputs a correction voltage of 0V~+Vcc to the second variable inductor if the input voltage of the non-inversion input terminal is higher than the input voltage of the inversion input terminal, and outputs the correction voltage of −Vcc~0V to the second variable inductor if the input voltage of the non-inversion input terminal is lower than the input voltage of the inversion input terminal.

13. A method of correcting horizontal deflection in horizontal-deflection correction circuit having a horizontal deflection coil for deflecting a scan electronic beam in a horizontal direction in response to a sawtooth current, said method comprising the steps of:
   generating, from a control stage, first and second control voltages having equal values to perform a linear correction for correcting horizontal deflection,
   generating the first and second control voltages having different values to perform a S-shaped correction for correcting the horizontal deflection;
   varying, in responsive to the first control voltage, an inductance of a first variable inductor connected in series to the horizontal deflection coil to correct a magnitude and a direction of the sawtooth current; and
   varying, in response to the second control voltage, an inductance of a second variable inductor connected in series to the first variable inductor in an opposite polarity to correct the magnitude and the direction of the sawtooth current.

14. The method as set forth in claim 13, wherein said first and second control voltages are generated by said control stage according to a frequency of an externally input horizontal synchronization signal.

15. A horizontal-deflection correction circuit, comprising:
   a horizontal deflection stage having horizontal deflection coil responsive to a sawtooth current;
   a control stage having a first control voltage output terminal and second control voltage output terminal;
   a first correction stage coupled between said horizontal deflection coil and said first control voltage output terminal, said first correction stage comprising:
      a first operational amplifier having a non-inverting input terminal connected to said first control voltage output terminal and an inverting input terminal connected to a reference voltage; and
      a first transformer having a primary coil connected to an output terminal of said first operational amplifier and a secondary coil serially connected to said horizontal deflection coil; and
   a second correction stage coupled between said secondary coil of said first transformer and said second control voltage output terminal, said second correction stage comprising:
      a second operational amplifier having a non-inverting input terminal connected to said second control voltage output terminal and an inverting input terminal connected to a reference voltage;
      a second transformer having a primary coil connected to an output terminal of said second operational amplifier and a secondary coil serially connected to said secondary coil of said first transformer; and
      a S-correction capacitor serially connected between said secondary coil of said second transformer and a ground terminal.

16. The horizontal-deflection correction circuit as set forth in claim 15, wherein said secondary coil of said first transformer is wound in a first direction and said secondary coil of said second transformer is wound in an second direction opposite said first direction.

17. The horizontal-deflection correction circuit as set forth in claim 15, wherein said secondary coil of said first transformer is variable and is wound in a first direction and said secondary coil of said second transformer is variable and is wound in an second direction opposite said first direction.

18. The horizontal-deflection correction circuit as set forth in claim 15, wherein said first correction stage further comprises:
   a first resistor connected between said first control voltage output terminal and said non-inverting input terminal of said first operational amplifier;
   a second resistor connected between a supply voltage and said inverting input terminal of said first operational amplifier;
   a third resistor connected between said ground terminal and said inverting input terminal of said first operational amplifier; and
   a forth resistor connected between said primary coil of said first transformer and said output terminal of said first operational amplifier.

19. The horizontal-deflection correction circuit as set forth in claim 15, wherein said second correction stage further comprises:
   a first resistor connected between said second control voltage output terminal and said non-inverting input terminal of said second operational amplifier;
   a second resistor connected between a supply voltage and said inverting input terminal of said second operational amplifier;
   a third resistor connected between said ground terminal and said inverting input terminal of said second operational amplifier; and
   a forth resistor connected between said primary coil of said second transformer and said output terminal of said second operational amplifier.

20. The horizontal-deflection correction circuit as set forth in claim 18, wherein said second correction stage further comprises:
   a fifth resistor connected between said second control voltage output terminal and said non-inverting input terminal of said second operational amplifier;
   a sixth resistor connected between a supply voltage and said inverting input terminal of said second operational amplifier;
   a seventh resistor connected between said ground terminal and said inverting input terminal of said second operational amplifier; and
   a eighth resistor connected between said primary coil of said second transformer and said output terminal of said second operational amplifier.

* * * * *